United States Patent
Ficht (10) Patent No.: US 9,869,267 B2
(45) Date of Patent: Jan. 16, 2018

(54) RECIPROCATING PISTON FOR A RECIPROCATING PISTON ENGINE AND RECIPROCATING PISTON ENGINE, AND CYLINDER OF A RECIPROCATING PISTON ENGINE

(75) Inventor: Reinhold Ficht, Kirchseeon (DE)

(73) Assignee: Bertwin R. Geist, Eurasburg (DE)

( * ) Notice: Subject to any disclaimer, the term of this patent is extended or adjusted under 35 U.S.C. 154(b) by 591 days.

(21) Appl. No.: 13/980,763

(22) PCT Filed: Nov. 14, 2011

(86) PCT No.: PCT/EP2011/070046
§ 371 (c)(1),
(2), (4) Date: Sep. 24, 2013

(87) PCT Pub. No.: WO2012/097893
PCT Pub. Date: Jul. 26, 2012

(65) Prior Publication Data
US 2014/0014060 A1    Jan. 16, 2014

(30) Foreign Application Priority Data

Jan. 21, 2011  (DE) .......................... 10 2011 009 094

(51) Int. Cl.
*F02F 3/00* (2006.01)
*F04B 53/14* (2006.01)
(Continued)

(52) U.S. Cl.
CPC ................ *F02F 3/00* (2013.01); *F04B 53/14* (2013.01); *F16J 1/008* (2013.01); *F16J 1/12* (2013.01);
(Continued)

(58) Field of Classification Search
CPC .......... F02F 3/00; F02F 3/0015; F02F 3/0023; F02F 3/0084; F02F 3/08; F02F 3/04;
(Continued)

(56) References Cited

U.S. PATENT DOCUMENTS 1,956,355 A * 4/1934 Junkers ........................... 92/246
2,176,281 A * 10/1939 Stillwagon ...................... 92/244
(Continued)

OTHER PUBLICATIONS

Kaye and Laby, Tables of Physical & Chemical Constants, Subsection 2.3.5 Thermal Expansion, published online Jul. 15, 2005 at http://www.kayelaby.npl.co.uk/versions/2_3_5/101202_thermal_expansion_kayeandlaby_2_3_5.pdf.*

*Primary Examiner* — Grant Moubry (57) ABSTRACT

The invention relates to a reciprocating piston composed of ceramic material for a reciprocating-piston engine with crank drive, wherein the reciprocating piston is rigidly screwed to a piston rod by a screw, wherein between the reciprocating piston and the piston rod there is braced at least one disc composed of metallic material, wherein the screw is composed of a metallic material, wherein the coefficient of thermal expansion $\alpha_{piston}$ of the material of the reciprocating piston is lower than the coefficient of thermal expansion $\alpha_{screw}$ of the material of the screw, and the disc is an expansion compensation disc, wherein the coefficient of thermal expansion $\alpha_{Disc\ 1;2}$ of the material of the expansion compensation disc is greater than the coefficient of thermal expansion $\alpha_{screw}$ of the material of the screw, and to a reciprocating-piston engine having a reciprocating piston of said type, and to a cylinder of a reciprocating-piston engine having a cylinder of said type.

11 Claims, 10 Drawing Sheets

(51) Int. Cl.
*F16J 1/00* (2006.01)
*F16J 1/12* (2006.01)

(52) U.S. Cl.
CPC .............. *F05C 2203/0808* (2013.01); *F05C 2203/0817* (2013.01); *F05C 2251/04* (2013.01); *F05C 2251/046* (2013.01)

(58) Field of Classification Search
CPC .......... F02F 3/045; F02F 3/047; F02F 3/0076; F05C 2201/021; F05C 2201/0412; F05C 2201/0448; F05C 2201/046; F05C 2201/90; F05C 2201/903; F05C 2203/08; F05C 2203/0808; F05C 2203/0817; F05C 2203/0882; F16J 1/005; F16J 1/006; F16J 1/01; F16J 1/12; C22C 21/00; C22C 14/00; C22C 38/00
USPC .............. 123/197.2, 193.6, 269; 29/888.04, 29/888.042, 888.044; 92/155, 208, 212, 92/215, 216, 219, 220, 221, 248, 25, 255, 92/256
See application file for complete search history.

(56) References Cited

U.S. PATENT DOCUMENTS

| | | | | |
|---|---|---|---|---|
| 2,471,477 | A * | 5/1949 | Bonnaud ..................... | 92/251 |
| 3,402,644 | A * | 9/1968 | Breen et al. ................. | 92/224 |
| 3,961,868 | A * | 6/1976 | Droege et al. ............... | 417/550 |
| 3,977,303 | A * | 8/1976 | Baker ........................... | 91/493 |
| 4,242,948 | A * | 1/1981 | Stang et al. ................. | 92/212 |
| 4,635,596 | A * | 1/1987 | Nakano et al. ............. | 123/197.3 |
| 4,751,871 | A * | 6/1988 | Burghardt et al. .......... | 92/212 |
| 4,862,754 | A * | 9/1989 | Nimberger ............... | G01N 1/14 73/864.62 |
| 4,920,864 | A * | 5/1990 | Skingle et al. ............. | 92/213 |
| 4,955,284 | A * | 9/1990 | Faulkner .................... | 92/248 |
| 5,975,040 | A * | 11/1999 | Silvonen ................. | F02F 3/0023 123/193.6 |
| 6,076,506 | A * | 6/2000 | Berlinger et al. ........ | 123/46 SC |
| 6,547,534 | B1 * | 4/2003 | Sakamoto et al. .......... | 417/244 |
| 6,817,278 | B2 * | 11/2004 | Hennemann et al. ........ | 92/255 |
| 7,503,291 | B2 * | 3/2009 | Gamble et al. ............ | 123/53.6 |
| 8,109,737 | B1 * | 2/2012 | Gamble et al. ............ | 417/397 |
| 2011/0091331 | A1 * | 4/2011 | Moutafis et al. ............ | 417/53 |

* cited by examiner

RECIPROCATING PISTON FOR A RECIPROCATING PISTON ENGINE AND RECIPROCATING PISTON ENGINE, AND CYLINDER OF A RECIPROCATING PISTON ENGINE

FIELD OF THE INVENTION

The present invention relates to a ceramic reciprocating piston for a reciprocating piston machine, in particular a reciprocating piston engine, having a crank mechanism, preferably a Scotch yoke mechanism, and having a piston rod rigidly connected to the reciprocating piston. The present invention also relates to a reciprocating piston machine, in particular a reciprocating piston engine, having a crank mechanism, preferably a Scotch yoke mechanism, and having such a ceramic reciprocating piston.

The invention also relates to a cylinder of a reciprocating piston machine, in particular a reciprocating piston engine, having a crank mechanism, preferably a Scotch yoke mechanism, having at least one ceramic cylinder bushing situated in a cylinder bore of the cylinder, and having a ceramic reciprocating piston that is guided so that it can reciprocate in the cylinder bushing.

BACKGROUND OF THE INVENTION

EP 0 197 449 B1 has disclosed a multi-part reciprocating piston for internal combustion engines, which in particular has a Scotch yoke mechanism and is rigidly connected to a piston rod. This piston includes a piston skirt that has a piston skirt base and is composed of a ceramic material, e.g. zirconium oxide, silicon nitride, or silicon carbide, in particular Si—SiC, and includes a piston base that has a head land and is likewise made of ceramic material and is provided with an annular groove for accommodating a split piston ring composed of a ceramic material. The piston base rests against the piston skirt base and the two main parts of the piston are radially fixed by means of a shared centering sleeve, likewise composed of ceramic material. The reciprocating piston also has a centering piece that is fixed on the piston rod with a snug fit and is composed of metal or of a metal alloy, with a base plate on which the piston skirt base rests and with an end cover that is made of the same material as the centering piece and rests against the piston base while extending radially to its head land. The end cover has a centering hub that is radially fixed relative to the centering piece, with an axial spacer gap between the two parts; the piston skirt base and the piston base are axially clamped between the end cover and the base plate by a screw connection associated with the piston rod. Because of the two-part embodiment, it is also possible to use piston rings composed of a ceramic material. This arrangement has proven useful.

DE 33 03 229 A1 has disclosed a ceramic internal combustion engine without piston lubrication, having a ceramic piston that travels in linear fashion in a ceramic cylinder; there is no contact between the ceramic piston and ceramic cylinder; instead, an annular gap is provided between them.

WO 00/25012 A1 has disclosed a carbon piston for an internal combustion engine. For example, piston rings composed of carbon can be used as piston rings for the piston. Also according to WO 00/25012 A1, the cylinder in which the carbon piston travels for example has a ceramic cylinder bushing, for example. The particular advantage of the carbon piston is that it has good limp-home properties.

The object of the present invention is to create a ceramic reciprocating piston for a reciprocating piston machine, in particular a reciprocating piston engine, having a crank mechanism, preferably a Scotch yoke mechanism, and having a piston rod rigidly connected to the reciprocating piston; a secure, permanent connection should be ensured, even during operation of the reciprocating piston machine.

Another object of the invention is to create a reciprocating piston machine equipped with such a reciprocating piston.

Another object of the invention is to create a cylinder of a reciprocating piston machine, in particular a reciprocating piston engine, having a crank mechanism, preferably a Scotch yoke mechanism, having at least one ceramic cylinder bushing situated in a cylinder bore of the cylinder, and having a ceramic reciprocating piston that is guided so that it can reciprocate in the cylinder bushing; a penetration of oil from the crank mechanism into the combustion chamber should be avoided and a long service life of the reciprocating piston machine should be ensured.

SUMMARY OF THE INVENTION

In certain embodiments, the invention is directed to a reciprocating piston composed of a ceramic material for a reciprocating piston machine, having a crank mechanism, preferably a Scotch yoke mechanism, in which the piston is rigidly connected to a piston rod by a screw, in particular a cap screw, and in which at least one disc composed of a metallic material is clamped between the reciprocating piston and the piston rod, characterized in that the screw is composed of a metallic material; the thermal expansion coefficient $\alpha_{piston}$ of the material of the reciprocating piston is lower than the thermal expansion coefficient $\alpha_{screw}$ of the material of the screw and the disc is an expansion compensation disc; and the thermal expansion coefficient $\alpha_{disc1;2}$ of the material of the expansion compensation disc is greater than the thermal expansion coefficient $\alpha_{screw}$ of the material of the screw. Two expansion compensation discs may be provided, with the reciprocating piston clamped between the expansion compensation discs. The thermal expansion coefficient $\alpha_{piston}$ may be $3.0 \cdot 10^{-6}$ to $6.5 \cdot 10^{-6}$ K$^{-1}$, or $4.5 \cdot 10^{-6}$ to $5.0 \cdot 10^{-6}$ K$^{-1}$. The thermal expansion coefficient $\alpha_{screw}$ may be $8.0 \cdot 10^{-6}$ to $10.0 \cdot 10^{-6}$ K$^{-1}$, or $9.0 \cdot 10^{-6}$ to $9.5 \cdot 10^{-6}$ K$^{-1}$. The thermal expansion coefficient $\alpha_{disc1}$ of the first expansion compensation disc may be $15.0 \cdot 10^{-6}$ to $19.0 \cdot 10^{-6}$ K$^{-1}$, or $16.5 \cdot 10^{-6}$ to $17.0 \cdot 10^{-6}$ K$^{-1}$. The thermal expansion coefficient $\alpha_{disc2}$ of the second expansion compensation disc may be $15.0 \cdot 10^{-6}$ to $19.0 \cdot 10^{-6}$ K$^{-1}$, or $16.5 \cdot 10^{-6}$ to $17.0 \cdot 10^{-6}$ K$^{-1}$. The reciprocating piston may be composed of a carbon material, in particular a graphite material.

In certain embodiments, the invention is directed to a reciprocating piston machine, in particular a reciprocating piston engine, in particular a reciprocating piston steam engine or reciprocating piston compressor, having a crank mechanism, in particular a Scotch yoke mechanism, characterized in that the reciprocating piston machine has a reciprocating piston as described above. In the reciprocating piston machine, the difference of the clamping force of the screw, in particular of the cap screw, at room temperature from the clamping force at the rated operating temperature of the reciprocating piston machine, which the reciprocating piston machine assumes during extended operation at the rated speed, may be <0. The thermal expansion coefficient $\alpha_{screw}$ of the cap screw, the thermal expansion coefficients $\alpha_{disc2\ disc1}$; $\alpha_{piston}$; $\alpha_{piston\ rod}$; $\alpha_{threaded\ bushing}$ of the parts clamped by the cap screw, the clamped lengths of these parts, and the clamping length of the cap screw are dimensioned so that the difference of the clamping force of the cap screw at room temperature from the clamping force at the rated operating temperature of the reciprocating piston machine, which the reciprocating piston machine assumes during extended operation at the rated speed, may be <0. The clamping force of the screw, in particular of the cap screw, at room temperature may be less than the clamping force at the rated operating temperature of the reciprocating piston machine.

In certain embodiments, the invention is directed to a cylinder of a reciprocating piston machine, in particular of a reciprocating piston engine, having a crank mechanism, in particular a Scotch yoke mechanism, having at least one ceramic cylinder bushing situated in a cylinder bore of the cylinder, and having a ceramic reciprocating piston that is guided so that it can reciprocate in the cylinder bushing, in particular without piston lubrication, as described above, wherein the reciprocating piston is composed of a carbon material and the cylinder bushing is preferably composed of a silicon carbide material.

The invention further includes a reciprocating piston machine, in particular a reciprocating piston engine or reciprocating piston compressor, having a crank mechanism, in particular a Scotch yoke mechanism, wherein the reciprocating piston machine has a cylinder as described above.

The invention will be explained in detail below by way of example in conjunction with the drawings.

DETAILED DESCRIPTION OF THE PREFERRED EMBODIMENTS

The reciprocating piston 1 (FIGS. 1, 6, and 9) has a piston base or piston base wall 2, a piston shaft or piston skirt or piston casing 3, and a piston axis 4.

Figure 4:
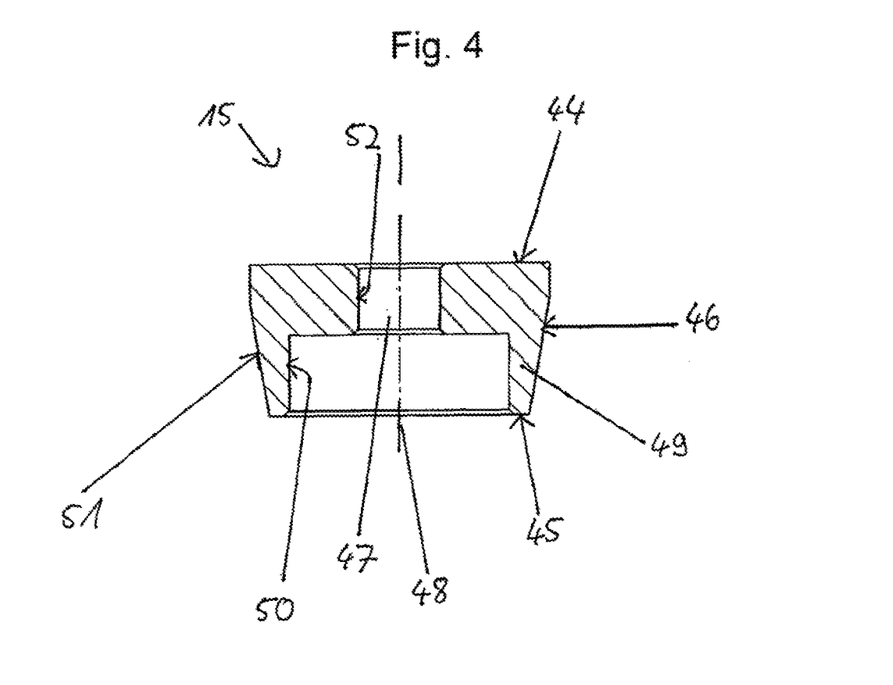
FIG. 4: is a longitudinal section through a second expansion compensation disc.
Figure 9:
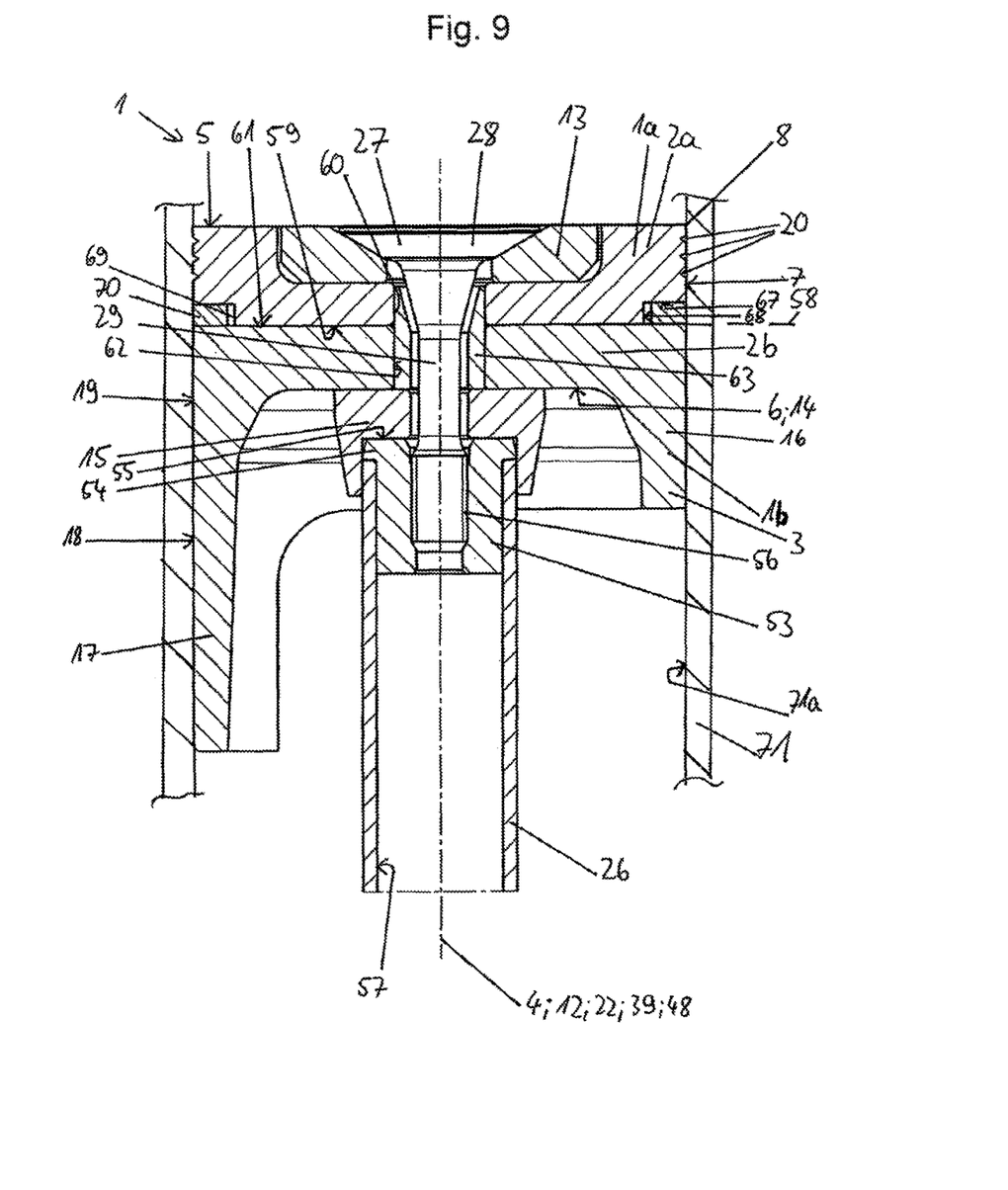
FIG. 9: is a longitudinal section through a reciprocating piston, having a piston rod rigidly connected to the reciprocating piston according to another embodiment of the invention.
Figure 10:
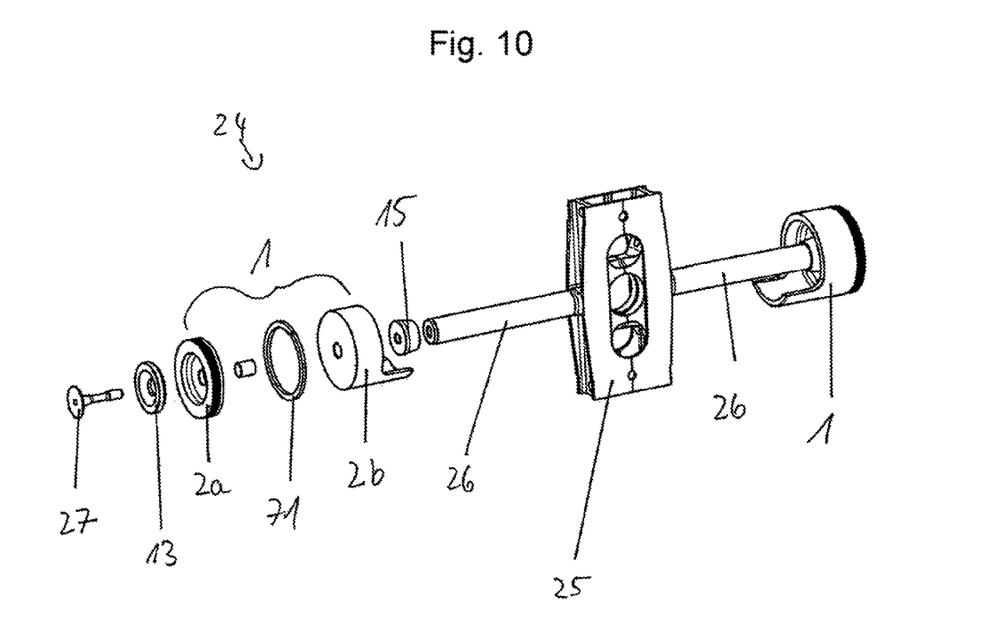
FIG. 10: is a simplified perspective view of a part of the Scotch yoke mechanism in which one of the reciprocating pistons is depicted in exploded fashion.

In the installed state, the reciprocating piston 1 is guided in an intrinsically known way so that it is able to reciprocate parallel to the piston axis 4 in a cylinder of a reciprocating piston machine. The reciprocating piston machine is preferably a reciprocating piston machine with a Scotch yoke mechanism 24 (FIG. 4). FIG. 10 schematically depicts part of the Scotch yoke mechanism 24 (without the crank mechanism) with a central Scotch yoke 25 and two piston rods 26, which are each rigidly connected to a respective reciprocating piston 1 according to the invention at their one end and are each rigidly connected to the Scotch yoke 24 at their other end. The two piston rods 26 are also preferably each supported in an intrinsically known way so that they are able to reciprocate parallel to the piston axis 4 in a respective partition wall bearing of a partition wall of the housing of the reciprocating piston machine (not shown). As is known, the partition wall seals the housing part enclosing or accommodating the crank mechanism from the housing part accommodating the piston 1 and the cylinder. Depending on the type of reciprocating piston machine, the Scotch yoke mechanism 24 serves to convert the translatory, oscillating motion of the two synchronous pistons 1 into a rotation of a crank shaft (not shown) or the rotation of the crankshaft is converted into a translatory, oscillating motion of the two synchronous pistons 1. In an intrinsically known way, the reciprocating piston machine also has a housing part for accommodating the crank mechanism and at least one cylinder with a cylinder bore for accommodating a piston 1 and a cylinder head (not shown) connected to the cylinder. According to a first aspect of the invention, the cylinder bore of the cylinder contains a cylinder bushing or cylinder liner 71 (FIG. 9) composed of ceramic material. In this case, the cylinder bushing 71 is preferably supported in the cylinder bore in accordance with the applicant's German patent application DE 10 2010 054 060 "Cylinder of a Reciprocating-Piston Machine and Reciprocating-Piston Machine," filed on Dec. 10, 2010, whose content is incorporated herein by reference. The cylinder according to the invention can furthermore be embodied as an individual cylinder, with several individual cylinders being suitably provided in a reciprocating piston machine. Alternatively, a plurality of cylinders according to the invention can be situated in a shared cylinder block. In this case, the individual cylinders can be arranged in a line or in the shape of a star.

In the installed state, the essentially disc-like piston base wall 2 has a base surface 5 at the cylinder head end and oriented toward the cylinder head, a base underside 6 oriented axially away from the latter, and a cylindrical base wall outer surface 7. The base surface 5 is preferably planar and perpendicular to the piston axis 4. In an intrinsically known way, the base surface of 5 closes one end of the combustion chamber or compression chamber in the reciprocating piston machine. The base wall outer surface 7 serves to guide the reciprocating piston 1 in the cylinder, in particular in the cylinder bushing, of the reciprocating piston machine. In addition, the bottom surface 5 has an annular, circumferential base edge 8 into which the base wall outer surface 7 transitions. In addition, a plurality of grooves 20 adjacent to one another in the axial direction are preferably provided in the base wall outer surface 7, which in an intrinsically known way, serve as a labyrinth seal.

The piston wall 2 also has a cavity or recess 9, particularly in the center, which extends from the base surface 5 into the piston base wall 2 in the direction of the piston axis 4. The recess 9 has a recess bottom surface 10 and a recess circumference surface 11. The recess bottom surface 10 is preferably planar and perpendicular to the piston axis 4. The recess circumference surface 11 is preferably cylindrically embodied. The recess 9 also has a recess axis 12 that is preferably coaxial to the piston axis 4. According to the invention, the recess 9 accommodates a first spacer disc or expansion compensation disc 13 whose function will be described in greater detail below.

The base underside 6 has a contact surface 14 that is arranged centrally with reference to the piston axis 4. The contact surface 14 is in particular embodied as planar and perpendicular to the piston axis 4. The contact surface 14 serves to contact a second spacer disc or expansion compensation disc 15 whose function will also be discussed in greater detail below.

The piston base wall 2 also has a continuous base opening 21 with a recess axis 22. The recess axis 22 is preferably coaxial to the piston axis 4. The base opening 21 extends continuously from the recess bottom surface 10 to the contact surface 14 through the piston base wall 2 and has a recess surface 23. The base opening 21, suitably viewed in the axial direction relative to the recess axis 22, first has a conically tapering section, which is adjoined by a cylindrical section.

In the axial direction, the piston base wall 2 is adjoined by the piston casing 3, which preferably starts with a first, in particular hollow, cylindrical or annular casing section 16. The first annular casing section 16 is adjoined by a cylinder casing-segment-shaped second casing section 17, which serves in a known way to control, in particular to open and close, the outlet slot. The piston casing 3 also has an in particular cylindrical casing outer surface 18. The casing outer surface 18 adjoins the base wall outer surface 7 and transitions into it. The base wall outer surface 7 and the casing wall outer surface 18 thus constitute an outer, in particular cylindrical, piston outer surface or piston running surface 19 that serves to guide the reciprocating piston 1 in the cylinder bore of the cylinder. The embodiment of the piston casing 3 can vary and depends in an intrinsically known way on the respective requirements, for example the position of the inlet, outlet, and overflow openings in a reciprocating piston machine that function in accordance with the 2-stroke principle. In reciprocating piston machines that function in accordance with the 4-stroke principle, for example the cylinder casing-segment-shaped second casing section 17 is not provided since the control of inlet and outlet openings occurs in an intrinsically known way by means of the valves.

The reciprocating piston 1, in particular the piston base wall 2 and the piston shaft 3, which is preferably embodied of one piece with it, is composed, according to the invention, of ceramic or a ceramic material, in particular SiC or a carbon material, in particular a graphite material. Carbon materials are ceramics or ceramically fired inorganic materials that are chiefly composed of elemental carbon in one of the three naturally occurring carbon modifications. Among others, these include graphite materials (e.g. pure, impregnated, or in composite with metals). For the present invention, the graphite materials, in particular carbon graphite or electrographite, are preferably used for the reciprocating piston 1 due to their outstanding dry lubrication properties and limp-home properties. As is known, carbon graphite is produced as the first stage in the multistage manufacturing process that uses coking of the carbon-containing raw materials to produce artificial graphite materials as an essentially amorphous product. As is known, electrographite is produced through graphitization, a high-temperature treatment of carbon graphite in which the crystallinity increases and the material obtains its graphitic properties. The carbon material can be enriched with other materials, for example also with metals or metal alloys.

Preferably, the material of the reciprocating piston 1 has a thermal expansion coefficient $\alpha_{piston}$ of $3.0 \cdot 10^{-6}$ to $6.5 \cdot 10^{-6}$ $K^{-1}$, preferably $4.5 \cdot 10^{-6}$ to $5.0 \cdot 10^{-6} K^{-1}$.

According to one aspect of the invention, the reciprocating piston 1, which is composed of a carbon material, in particular a graphite material, is guided so that it is able to reciprocate in a direction parallel to the piston axis 4 in a ceramic cylinder bushing 71. According to the invention, the cylinder bushing 71 is preferably composed of SiC (silicon carbide) or of $Si_3N_4$ (silicon nitride). In particular, the cylinder bushing 71 is composed of Si-metal-infiltrated SiC (Si SiC) or SiSiC—C (carbon-containing silicon carbide) or of a composite of SiC and graphite, preferably SiC30, or a composite of $Si_3N_4$ and graphite. The advantage of graphite-containing materials is that graphite functions as a lubricant. As a result, in the context of the present invention, preferably ceramic composite materials are used for the cylinder bushing 71, which have particles composed of a solid, in particular mineral, lubricant, in particular are infiltrated with the lubricant; lubricants other than graphite are also a possibility, e.g. molybdenum sulfide $MoS_2$. Moreover, the solid lubricant does not have to be infiltrated, but can also be mixed with the raw compound during manufacturing.

With this material combination selected according to the invention, no lubrication is required. The reciprocating piston 1 therefore runs dry in the cylinder bushing 71. This is made possible by the material pairing according to the invention of the soft carbon material with a hard ceramic material. The graphite component of the carbon material ensures a sufficient solid lubrication and good limp-home properties. Since no oil for lubrication is present, this also means that no oil can get into the exhaust gases. The invention is particularly advantageous for reciprocating piston engines that run on biogas. This is because biogases often contain impurities, among other things a high sulfur content, causing sulfuric acid to be released during combustion. The toxic byproducts often attack the materials of the piston, which is not problematic in the reciprocating piston 1 according to the invention composed of the carbon material because the carbon material is resistant to corrosion by aggressive gases. Furthermore, the presence of the partition wall of the housing would require a separate piston lubrication, which would be expensive; the invention avoids this problem.

Furthermore, no piston ring is required since the thermal expansion coefficients of carbon and ceramic, in particular SiC, are relatively similar.

The diameter of the piston running surface 19 is also somewhat smaller than the inner diameter of the cylinder bore or diameter of the cylinder bushing running surface 71a of the cylinder bushing 71—if one is provided—so that an annular gap is present between the piston running surface 19 and a running surface of the cylinder bore or cylinder bushing running surface 71a. The annular gap must be dimensioned so that it ensures a sufficient seal of the combustion chamber or compression chamber.

As explained above, the reciprocating piston 1 according to the invention is also rigidly connected to the piston rod 26. The attaching means provided for this includes a cap screw 27 and the first and second expansion compensation discs 13; 15.

The cap screw 27 (FIG. 5) is preferably a countersunk screw and has a screw head 28 and a screw shaft 29. The screw head 28 preferably has a conical or tapered head support surface 30 that tapers toward the screw shaft 29. The inclination of the head support surface 30 in this case is as slight as possible in order to achieve a good load distribution. Furthermore, the screw head 28 preferably has a head surface 72 with an engagement recess for a corresponding tool and a cylindrical outer head surface 73. The head surface 72 transitions via a first circumferential edge 74 into the outer head surface 73 and the outer head surface 73 transitions via a second circumferential edge 75 into the head support surface 30. The screw shaft 29, starting from the screw head 28, first has a conically tapering screw shaft section 31 whose outer surface is smooth, i.e. has no threads. The screw shaft section 31 is adjoined by a first cylindrical screw shaft section 32 whose outer surface is likewise smooth. The screw shaft section 32 is adjoined by a second cylindrical screw shaft section 33, which has an external thread 34. In order for elastic stretching of the screw to be able to be favorably absorb chronologically alternating changes in force and length that occur during operation, the outer diameter of the first cylindrical screw shaft section 32 is suitably smaller than the root diameter of the external thread 34.

Figure 5:
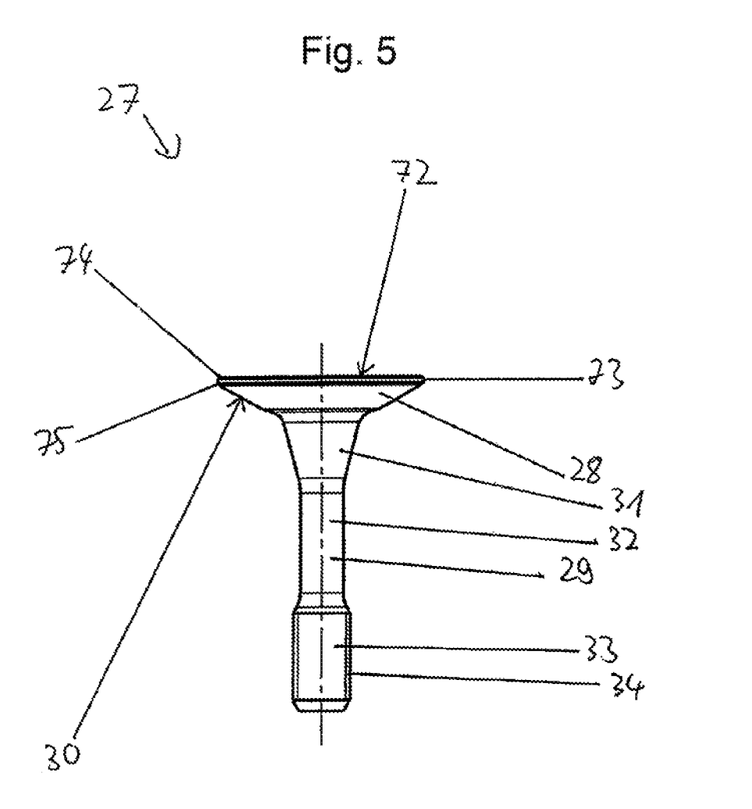
FIG. 5: is a longitudinal section through a cap screw.

Furthermore, the cap screw 27 is composed of a metallic material, in particular titanium or a titanium alloy, or of steel, e.g. heat-resistant stainless steel, or of aluminum or an aluminum alloy. Preferably, the material of the cap screw 27 has a thermal expansion coefficient $\alpha_{screw}$ of $8.0 \cdot 10^{-6}$ to $10.0 \cdot 10^{-6}$ K$^{-1}$, preferably $9.0 \cdot 10^{-6}$ to $9.5 \cdot 10^{-6}$ K$^{-1}$.

The first expansion compensation disc 13 (FIG. 3) is embodied in the form of an annular disc and has a first disc end surface 35, a second disc end surface 36 oriented away from the latter, a disc circumference surface 37, and a central disc opening 38 that has a disc opening axis 39 and extends from the first disc end surface 35 to the second disc end surface 36. The two disc end surfaces 35; 36 are in particular planar and perpendicular to the disc opening axis 39. The disc circumference surface 37 is preferably cylindrically embodied and transitions via a bevel 40 into the second disc end surface 36. The disc opening 38 has an opening surface 41, which, starting from the first disc end surface 35, has a first tapered surface section 42 that narrows conically toward the second disc end surface 36 and is adjoined by a second cylindrical surface section 43. The surface section 42 serves to support the head support section 30 of the cap screw 27. Consequently, the inclination or pitch of the first surface section 42 corresponds to the inclination or pitch of the head support surface 30.

Figure 3:
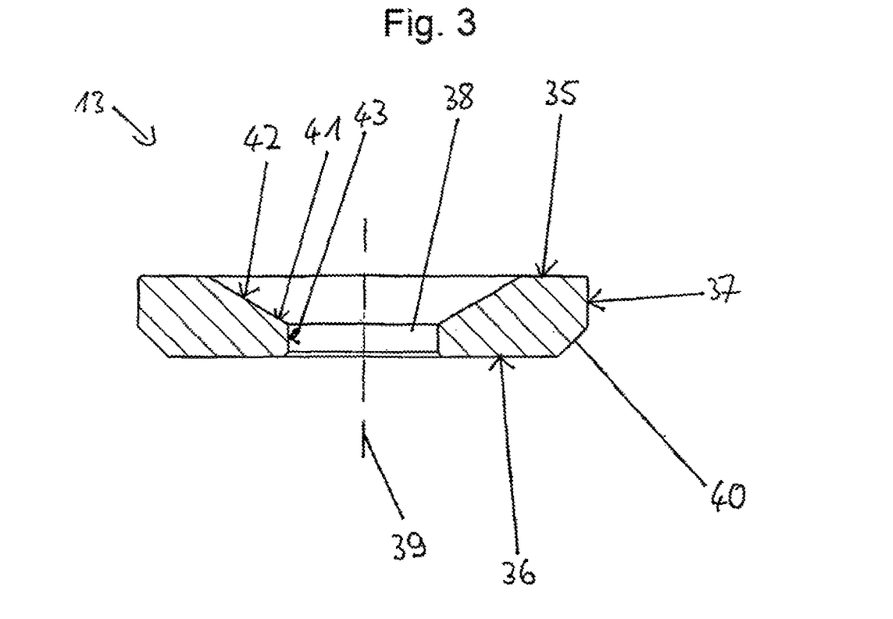
FIG. 3: is a longitudinal section through a first expansion compensation disc.

Furthermore, the first expansion compensation disc 13 is preferably composed of a metallic material, e.g. a metal alloy, in particular steel, in particular heat-resistant stainless steel, or of aluminum or an aluminum alloy. Preferably, the material of the first expansion compensation disc 13 has a thermal expansion coefficient $\alpha_{disc1}$ of $15.0 \cdot 10^{-6}$ to $19.0 \cdot 10^{-6}$ K$^{-1}$, preferably $16.5 \cdot 10^{-6}$ to $17.0 \cdot 10^{-6}$ K$^{-1}$.

The second expansion compensation disc 15 (FIG. 4) is likewise embodied in the form of an annular disc and has a first disc end surface 44, a second disc end surface 45 oriented away from the latter, a disc circumference surface 46, and a central disc opening 38 that has a disc opening axis 48 and extends from the first disc end surface 44 to the second disc end surface 45. The two disc end surfaces 44; 45 are in particular planar and perpendicular to the disc opening axis 48. The disc circumference surface 47 has an opening surface 52 that is preferably cylindrically embodied. The second expansion compensation disc 15 also preferably has an annular or tubular or hollow cylindrical collar 49 that adjoins the second disc end surface 45 and from it, protrudes essentially in a direction parallel to the disc opening axis 48.

The collar 49 has a cylindrical inner collar surface 50 and an outer collar surface 51, which continuously adjoins the disc circumference surface 46. In particular the outer collar surface 51 tapers in conical fashion, starting from the second disc end surface 45. In particular, starting from the first disc end surface 44, the disc circumference surface 46 first has a cylindrical section, which is adjoined by a conically tapering section. The latter serves to optimize the flow of air that sweeps along the base underside 6 during the oscillating motion of the reciprocating piston 1. For this reason, the curvature of the base underside 6 is also flow-optimized.

The second expansion compensation disc 15 is preferably likewise composed of a metallic material, e.g. a metal alloy, in particular steel, in particular heat-resistant stainless steel, or of aluminum or an aluminum alloy. Preferably, the material of the second expansion compensation disc 15 has a thermal expansion coefficient $\alpha_{disc2}$ of $15.0 \cdot 10^{-6}$ to $19.0 \cdot 10^{-6}$ K$^{-1}$, preferably $16.5 \cdot 10^{-6}$ to $17.0 \cdot 10^{-6}$ K$^{-1}$. Preferably, the two expansion compensation discs 13; 15 are composed of the same material. They can, however, also be composed of different materials.

Figure 6:
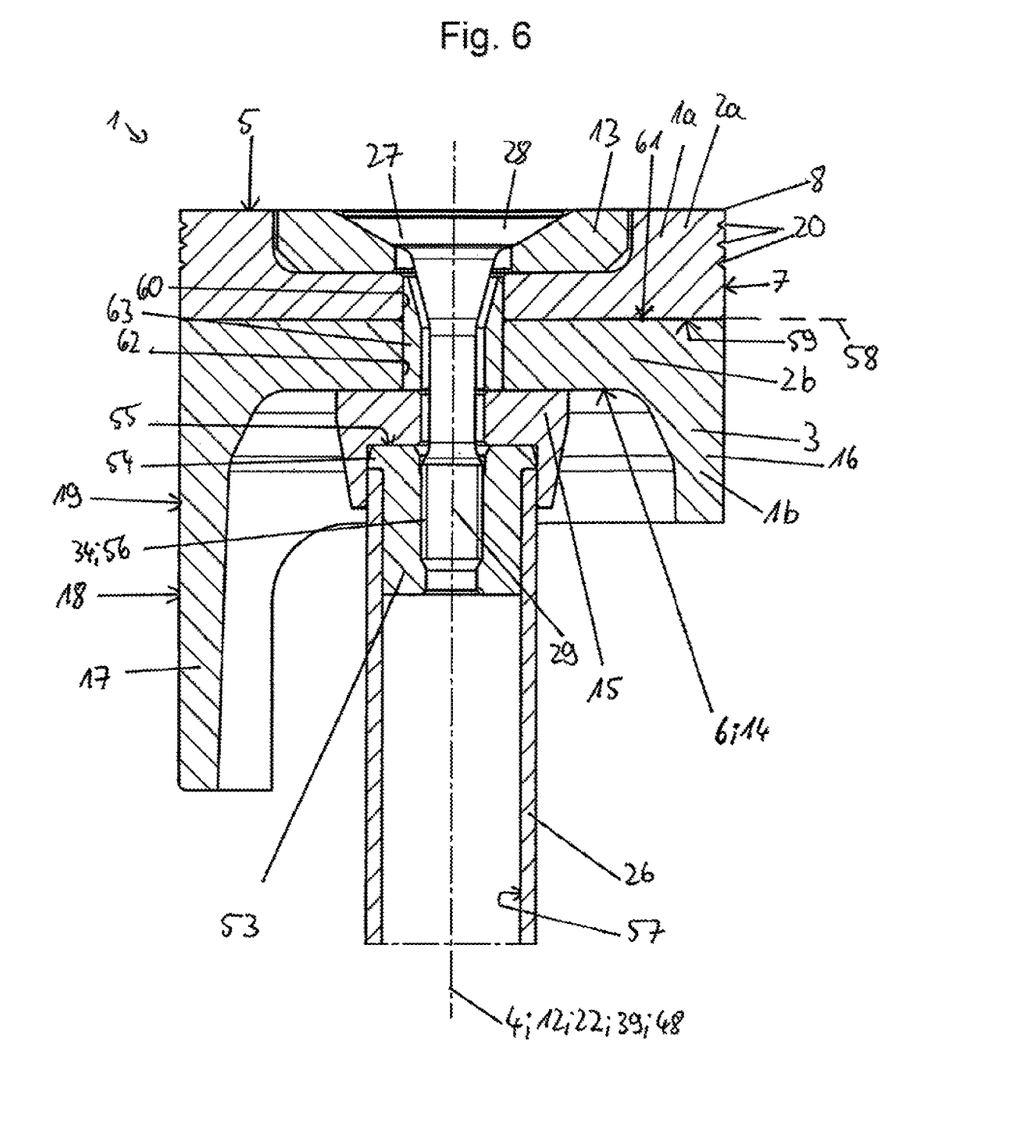
FIG. 6: is a longitudinal section through a reciprocating piston, having a piston rod rigidly connected to the reciprocating piston according to another embodiment of the invention.
Figure 7:
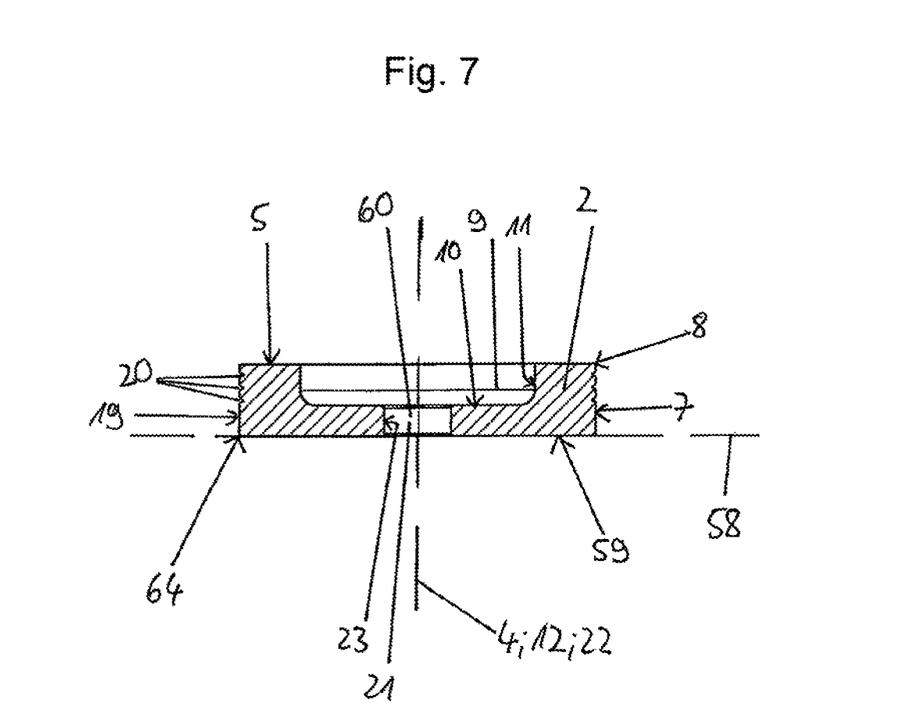
FIG. 7: is a longitudinal section through a first piston part of the reciprocating piston according to FIG. 6.
Figure 8:
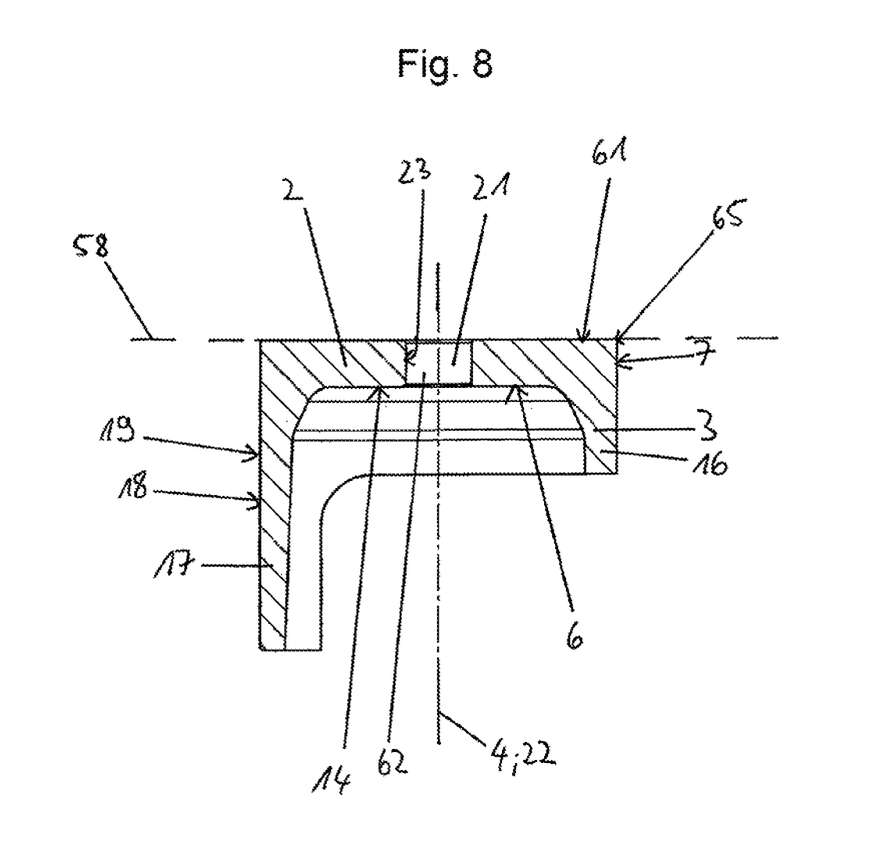
FIG. 8: is a longitudinal section through a second piston part of the reciprocating piston according to FIG. 6.

The piston rod 26 is preferably tubular or hollow cylindrical and has an in particular cylindrical inner rod surface 57 and an in particular cylindrical outer rod surface 58. Furthermore, the piston rod 26, at least at its broad end oriented toward the reciprocating piston 1, has a threaded bushing 53 that is inserted into the piston rod 26 in form-locked fashion, in particular is welded or hard-soldered into it. The threaded bushing 53 has a central bushing opening extending through it, with an internal thread 56 that corresponds to the external thread 34 of the cap screw 27 (FIGS. 6, 9). In addition, the threaded bushing 53 preferably has a bushing collar 54 with a planar end surface 55 (FIGS. 6, 9). The threaded bushing is preferably composed of a metallic material, in particular high-strength steel, and the piston rod 26 is preferably likewise composed of a metallic material, in particular high-strength steel.

In the assembled state, i.e. during operation of the reciprocating piston machine, the reciprocating piston 1 is screw connected by means of the cap screw 27 to the piston rod 26 so that the reciprocating piston 1 and the piston rod 26 are detachably, but rigidly connected to each other. Preferably, two expansion compensation discs 13; 15 are clamped between the two parts to be connected to each other.

In particular, the first expansion compensation disc 13 is situated in the recess 9 so that the second disc end surface 36 rests against the recess bottom surface 10 and the disc opening 38 is aligned with the base opening 21 in a direction parallel to the piston axis 4. The first disc end surface 35 preferably ends flush with the base surface 5. In addition, the diameter of the recess circumference surface 11 is greater than the diameter of the disc circumference surface 37 so that a first annular gap is present between the recess circumference surface 11 and the disc circumference surface 37. The first annular gap is necessary because the thermal expansion coefficient $\alpha_{disc1}$ of the first expansion compensation disc 13 is greater than the thermal expansion coefficient $\alpha_{piston}$ of the piston 1. As a result, when exposed to heat, the first expansion compensation disc 13 expands more than the reciprocating piston 1. The first annular gap at room temperature must be appropriately dimensioned in order to ensure that the first expansion compensation disc 13 does not expand to the point where it contacts the recess circumference surface 11 and presses against it, thus inducing stresses in the reciprocating piston 1.

The second expansion compensation disc 15 rests with its first disc end surface 44 against the contact surface 14 of the reciprocating piston 1; the disc opening 47 is likewise aligned with the base opening 21 in a direction parallel to the piston axis 4. The piston base wall 2 is thus situated and clamped between the first and second expansion compensation discs 13; 15.

Furthermore, the rod end of the piston rod 26 oriented toward the reciprocating piston 1 is placed inside the disc collar 49 in a form-locked fashion; the end surface 55 of the bushing collar 54 rests against the second disc end surface 45 and the inner collar surface 50 of the disc collar 49 rests against the outer rod surface 58 so that the piston rod 26 is centered relative to the second expansion compensation disc 15.

The cap screw 27 clamps the reciprocating piston 1, the two expansion compensation discs 13; 15, and the piston rod 26 to one another. For this purpose, the screw head 28 is placed inside the disc opening 38 of the first expansion compensation disc 13; the head support surface 30 of the screw head 28 rests against the conical surface section 42 of the disc opening 38. The low inclination angle β produces a relatively large support surface between the head support surface 30 and the conical surface section 42 so that the force of the cap screw 27 is favorably distributed and excessive forces do not act on the recess bottom surface 10 of a ceramic reciprocating piston 1. The screw shaft 29 extends with the first and second screw shaft sections 31; 32 through the rest of the disc opening 38 of the first expansion compensation disc 13, the base opening 21, and the disc opening 47 of the second expansion compensation disc 15. In particular, the first screw shaft section 31 is situated inside the conical region of the second opening surface 23 of the base opening 21 and the second screw shaft region 32 is in particular situated inside the cylindrical region of the second opening surface 23 of the disc opening 47 of the second expansion compensation disc 15. The outer diameter of the screw shaft sections 31; 32 are each smaller than the respective diameter of the surfaces 23; 43 encompassing them so that a second annular gap is present between the screw shaft sections 31; 32 and the surfaces 23; 43 encompassing them. The second annular gap in the region between the piston 1 and the screw shaft 29 is necessary because the thermal expansion coefficient $\alpha_{screw}$ of the cap screw 27 is greater than the thermal expansion coefficient $\alpha_{piston}$ of the piston 1. As a result, when exposed to heat, the cap screw 27, in particular the screw shaft 29, expands more than the reciprocating piston 1. The second annular gap at room temperature must be appropriately dimensioned in order to ensure that the screw shaft 29 does not expand to the point where it contacts the opening surface 23 of the base opening 21 and presses against it, thus inducing stresses in the reciprocating piston 1.

The third screw shaft section 32 is screwed with its external thread 34 into the internal thread 56 of the threaded bushing 53 of the piston rod 26 so that the piston screw clamps the piston rod 26, the two expansion compensation discs 13; 15, and a reciprocating piston 1 to one another.

When connecting the reciprocating piston 1 to the piston rod 26, the problem is that the manufacture and assembly of the individual parts as a rule occur at room temperature, but the parts are exposed to higher temperatures during operation of the reciprocating piston machine. Since the thermal expansion coefficient $\alpha_{screw}$ of the metallic cap screw 27, due to the material of which is composed, is greater than the thermal expansion coefficient $\alpha_{piston}$ of the ceramic piston 1, when exposed to heat during operation, in particular in the process of heating from room temperature 2 operating temperature, the cap screw 27, particularly in a direction parallel to the piston axis 4, expands more in terms of percentage and in actual distance than the reciprocating piston 1. Without the expansion compensation discs 13; 15, this would result in a significant reduction or even total loss of clamping force and a loosening of the screw connection. According to the invention, the thermal expansion coefficients $\alpha_{disc1}$ and $\alpha_{disc2}$ of the two expansion compensation discs 13; 15 are therefore greater than the thermal expansion coefficient $\alpha_{screw}$ of the cap screw 27 so that they expand more in terms of percentage and in actual distance than the cap screw 27. The significantly smaller expansion of the reciprocating piston 1 in comparison to the cap screw 27 is thus balanced out or compensated for by the large expansions of the two expansion compensation discs 13; 15.

Figure 1:
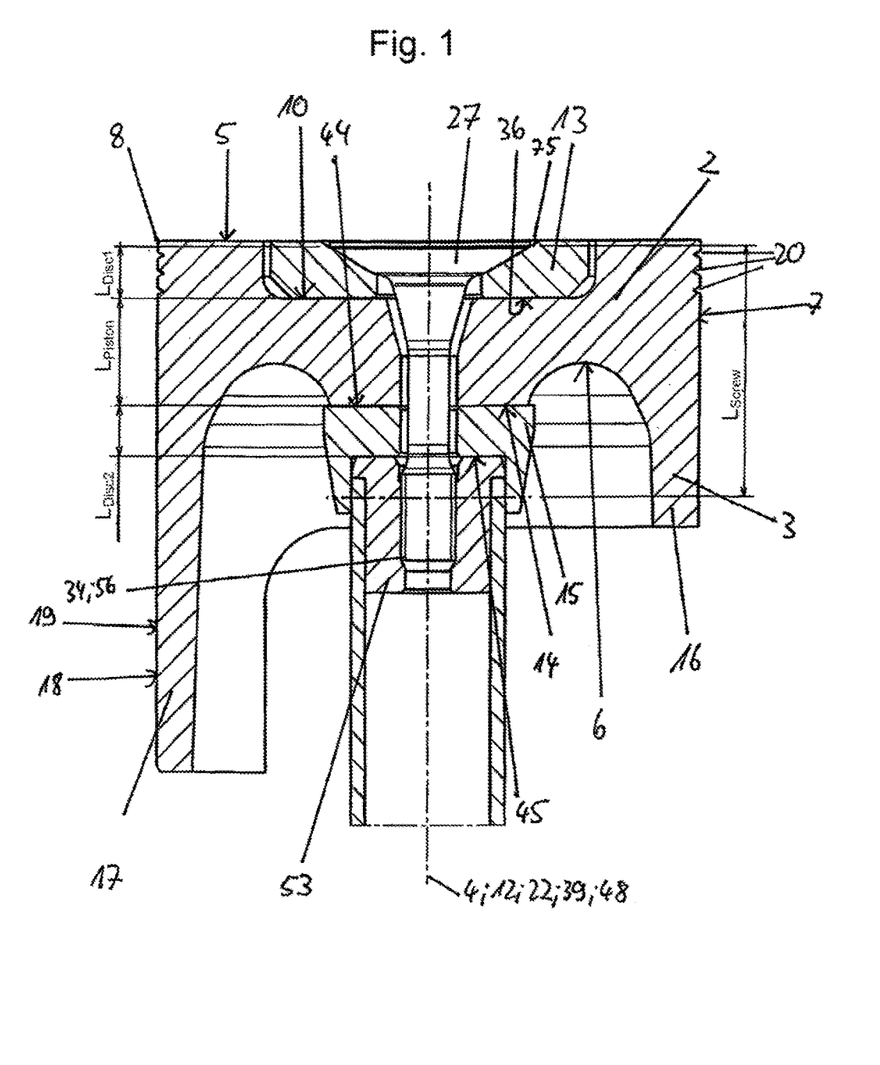
FIG. 1: is a longitudinal section through a reciprocating piston having a piston rod rigidly connected to the reciprocating piston according to a first embodiment of the invention.
Figure 2:
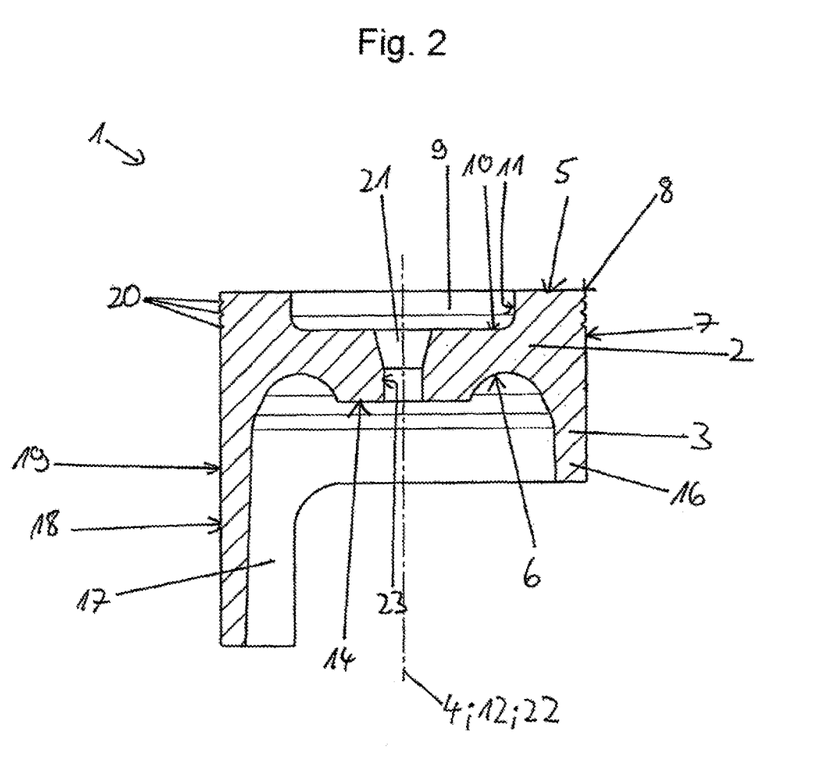
FIG. 2: is a longitudinal section through the reciprocating piston according to FIG. 1, without the piston rod and connecting means.

The decisive factor here is the length changes of the clamped regions, each length being the span in the direction parallel to the piston axis 4. According to the invention, an approximate design was arrived at by taking into consideration the length change $\Delta L_{piston}$ of the reciprocating piston 1 in the clamped region, i.e. the region between the recess bottom surface 10 and the contact surface 14, whose length at room temperature is $L_{0,piston}$ (FIG. 1), the length change $\Delta L_{disc1}$ of the first expansion compensation disc 13 in the clamped region, i.e. in the region between the first edge 74 of the screw head 28 or the head-end beginning of the head support surface 30 and the second disc end surface 36, whose length at room temperature is $L_{0,disc1}$ (FIG. 1), the length change $\Delta L_{disc2}$ of the second expansion compensation disc 13 in the clamped region, i.e. in the region between the first disc end surface 44 and the second disc end surface 45, whose length at room temperature is $L_{0,disc2}$ (FIG. 1), and the length change $\Delta L_{screw}$ of the cap screw 27 in the clamped region, whose length at room temperature is $L_{0,screw}$ (FIG. 1). For the approximate design, the clamping region of the cap screw 27 was determined as the region between the first edge 74 of the screw head 28 and the beginning of the external thread 34 plus one fourth of the screw depth of the cap screw 27.

For the length changes $\Delta L_{screw}$, $\Delta L_{disc1}$, $\Delta L_{disc2}$, and $\Delta L_{piston}$, of the clamped lengths $L_{0,disc1}$, $L_{0,disc2}$, $L_{0,piston}$, and of the clamping length $L_{0,screw}$, at room temperature when heated to the rated operating temperature, i.e. the operating temperature that the reciprocating piston machine reaches during continuous operation at the rated speed, the following equation applies: $\Delta L_{screw} - (\Delta L_{disc1} + \Delta L_{disc2} + \Delta L_{piston}) = \Delta L_{total}$, where preferably, 0.01 mm ≤ |$\Delta L_{total}$| ≤ 0.03 mm. Preferably, $\Delta L_{total} < 0$. The rated speed is the speed at which the reciprocating piston engine generates the greatest possible output at full load, i.e. the rated output, or in a reciprocating piston compressor, the operating speed.

For the approximate design, average operating temperatures of the individual components were assumed.

For n discs, the following equation applies: $\Delta L_{discs} = \Delta L_{disc1} + \Delta L_{disc2} + \ldots + \Delta L_{disc,n}$ and thus: $\Delta L_{screw} - (\Delta L_{discs} + \Delta L_{piston}) = \Delta L_{total}$.

In particular, the thermal expansion coefficients $\alpha_{screw}$, $\alpha_{disc1}$, $\alpha_{disc2}$, and $\alpha_{piston}$ and in particular the lengths $L_{0,screw}$, $L_{0,disc1}$, $L_{0,disc2}$, and $L_{0,piston}$ of the clamping region of the cap screw 27 and the clamped regions of the reciprocating piston 1 and of the two expansion compensation discs 13; 15 parallel to the piston axis 4 are dimensioned so that the clamping force is largely retained when the temperature is increased from room temperature to the rated operating temperature.

But $\alpha_{disc1}$ and $\alpha_{disc2}$ also must not be selected to be too high because although an excessive decrease in the clamping force would in fact result in a detachment of the connection, too excessive an increase in the clamping force would result in a fracturing of the reciprocating piston 1 due to the brittleness of the ceramic material. In establishing the design, it is thus necessary to take into account the fact that the operating temperatures of the individual parts 1; 13; 15; 27 can be different among other things due to their different distances from the base surface 5 and thus from the combustion chamber and furthermore, the individual parts 1; 13; 15; 27 can have different temperature distributions. Moreover, with an exact design, it is also necessary to take into account the length change of the cap screw 27 in the region of the entire thread 34 and the length changes of the clamped regions of the piston rod 26 and the threaded bushing 53 in the region of the thread 34. In other words, it is necessary to determine the length changes of the individual parts at the respective operating temperatures and temperature distributions.

According to another embodiment of the invention (FIG. 6), the reciprocating piston 1 is split into two parts in a direction parallel to the piston axis 4 and has a first piston part 1a oriented toward the combustion or compression chamber and a second piston part 1b oriented toward the crank mechanism, which are clamped to each other. In particular, the reciprocating piston 1 is divided in the vicinity of the piston base wall 2. A parting plane 58 is in particular perpendicular to the piston axis 4. In addition, the parting plane 58 is situated between the base surface 5 and the base underside 6. As a result, the reciprocating piston 1 has a first piston base wall part 2a and a second piston base wall part 2b. In particular, the first piston part 1a constitutes the first piston base wall part 2a and the second piston part 1b has the second piston base wall part 2b. The first piston part 1a or first piston base wall part 2a has the base surface 5 and oriented axially away from this, a first, in particular planar, parting surface 59 and preferably, the grooves 20. The first parting surface 59 transitions via a first continuous circumferential edge 64 into the base wall outer surface 7 of the first piston base wall part 2a. In addition, the first piston base wall part 2a has a first part or opening section 60 of the base opening 21, which extends through from the base surface 50 to the parting surface 59. The second piston part 1b has the base underside 6 and oriented axially away from this, a second, in particular planar, parting surface 61 and the piston shaft 3. The second parting surface 61 transitions via a second continuous circumference edge 65 into the base wall outer surface 7 of the second piston base wall part 2b. The second piston base wall part 2b also has a second part or opening section 62 of the base opening 21, which extends from the base underside 6 to the second parting surface 61. The two opening sections 60; 62 are flush with each other in a direction parallel to the piston axis 4 and form the base opening 21. The two opening sections 60; 62 here preferably have the same diameter so that the base opening 21 is embodied as continuously cylindrical. In addition, a centering sleeve 63 is suitably provided for centering the two piston parts 1a; 1b and two piston base wall parts 2a; 2b, respectively, relative to each other. The centering sleeve 63 is situated inside the base opening 21, i.e. inside the two openings 60; 62. The outer diameter of the centering sleeve 63 corresponds to the diameter of the opening surface 23 of the base opening 21. The inner surface of the centering sleeve 63, preferably in the axial direction relative to the opening axis 22, first has a conically tapering section, which is then adjoined by a cylindrical section. In addition, the diameters of the inner surface are dimensioned so that the inner surface is spaced apart from the first and second screw shaft sections 31; 32. The room-temperature length of the centering sleeve 63 in the axial direction relative to the piston axis 4 corresponds in particular to the length of the base opening 21 in the axial direction relative to the piston axis 4. Since the outer diameter of the centering sleeve 63 is smaller than the diameter of the second surface section 43, the centering sleeve 63 when heated is free to expand in the axial direction toward the base surface 5. In addition, the centering sleeve 63 preferably is composed of a metallic material, in particular titanium or a titanium alloy.

The two piston parts 1a; 1b, in particular the two piston base wall parts 2a; 2b, are likewise clamped to each other by means of the cap screw 27. In this case, a rotation-preventing element such as an alignment pin (not shown) can also be provided in order to prevent the two piston parts 1a; 1b from rotating relative to each other. Since according to the invention, the clamping force is retained or changes only slightly, even at operating temperature, the clamping force is sufficient to prevent a rotation of the two piston parts 1a; 1b relative to each other and a rotation-preventing element is not absolutely required.

The advantage of the split embodiment is that the two circumferential edges 64, 65 constitute a blow-by prevention without requiring a piston ring. In addition, in the event of damage to the base surface 5, it is possible to replace only the first piston part 1, which reduces costs.

According to another embodiment (FIG. 9), the piston 1 is likewise split in a fashion analogous to the preceding embodiment. In addition, the first piston base wall part 2a has a circumferential stepped shoulder 66, which, starting from the first parting plane 59, extends into the first piston base wall part 2a in both the axial and radial direction with regard to the piston axis 4. The stepped shoulder 66 is thus embodied as stepped radially inward and preferably has a first planar step surface 67 extending perpendicular to the piston axis 4 and a second cylindrical step surface 68 extending perpendicular to the first step surface 67. When assembled, the first and second step surfaces 67; 68 and a radially outer subregion of the second parting surface 61 form a circumferential piston ring groove 69 for accommodating a piston ring 70. The piston ring 70 is preferably composed of a ceramic material, in particular a carbon material. Particularly for piston rings composed of ceramic, this embodiment with the two-part split piston 1 is particularly advantageous because their elasticity is often insufficient to allow them to be mounted over the piston 1 from the outside.

The advantage of the invention on the one hand is that through a deliberate material selection, arrangement, and dimensioning of the expansion compensation discs ensures a permanent connection of the reciprocating piston 1 to the piston rod 26, even during operation of the reciprocating piston machine. The connection according to the invention compensates for the different thermal expansions of the reciprocating piston 1 and the cap screw 27. It prevents a loosening of the connection. It also prevents initially exerted clamping force from fracturing the reciprocating piston due to the brittleness of the ceramic material. This is because excessive tightening of the cap screw 27 during the assembly, which takes place at room temperature, is not necessary in order to attain the optimal clamping force during operation. This ensures that the thermal expansion coefficient $\alpha_{screw}$ of the cap screw 27, the thermal expansion coefficients $\alpha_{disc2\ disc1}$; $\alpha_{piston}$; $\alpha_{piston\ rod}$; $\alpha_{threaded\ bushing}$ of the parts 1; 13; 15; 26; 53 clamped by means of the cap screw 27, in particular the expansion compensation discs 13; 15, the clamped lengths of these parts 1; 13; 15; 26; 53, and the clamping length of the cap screw 27 are dimensioned so that the difference of the clamping force of the cap screw 27 at room temperature from the clamping force at the rated operating temperature of the reciprocating piston machine, which the reciprocating piston machine assumes during extended operation at the rated speed, is <0.

The scope of the invention naturally also includes a solid embodiment of the piston rod. In this case, the internal thread required for the screw connection is provided directly in the piston rod at the end of the piston rod.

The scope of the invention also includes embodiments in which the two piston base wall parts 2a; 2b are not split along a planar parting plane, but stead, the parting surfaces 59; 61 are contoured and embodied correspondingly to each other. In this case, the centering sleeve 63 could be eliminated.

A screw is a cylindrical pin or stud on which a thread is provided. In screws with heads ("cap screws"), the annular surface under the head serves as an axial stop and the threaded pin constitutes the screw shaft. In the context of the invention, it is not absolutely necessary to use a cap screw 27. Instead, it is also possible to use a screw without a screw head that only has a threaded pin or threaded stud 76 with an external thread, particularly in combination with a nut 77. The metallic nut 77 and the metallic threaded pin 76 in this case are preferably composed of the same material, particularly titanium or a titanium alloy, analogous to the cap screw 27. In this embodiment, the threaded pin 76 is screwed into the internal thread 56 of the threaded bushing 53 at one end and at the other end, in lieu of the screw head, the nut 77 is screwed on (not shown) so that the individual parts can be clamped to one another.

Figure 11:
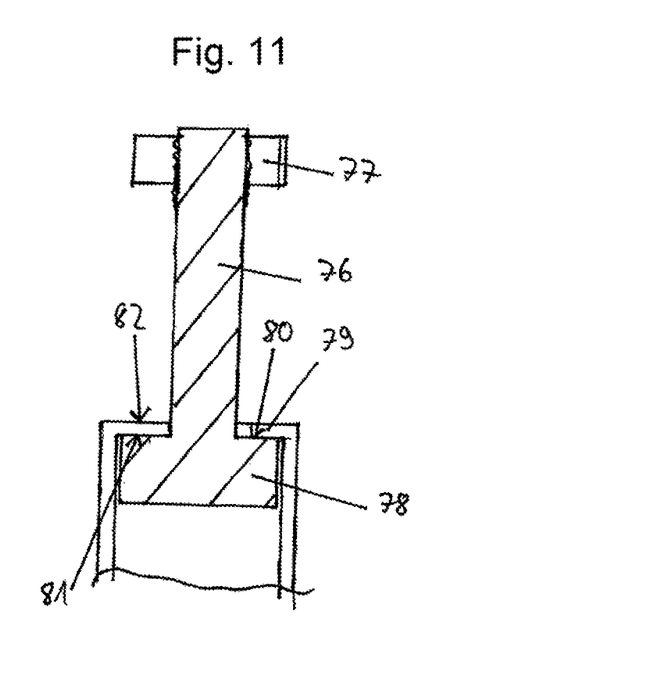
FIG. 11: is a simplified longitudinal section through the piston rod with a screw according to an alternative embodiment of the screw.

According to an alternative embodiment (FIG. 11), the threaded pin 76 is embodied as thickened or widened at one end, its end oriented toward the piston rod 26, and at one end, has a widened, in particular fully cylindrical, end region 78. The end region 78 is preferably embodied of one piece with the threaded pin 76. The end of the piston rod 26 oriented toward the piston 1 is equipped with an annular opening in the center; the base wall 79 closes the hollow, cylindrical piston rod 26. The threaded pin 76 is inserted into the piston rod 26 from the rod end oriented away from the piston 1; the widened end region 78 is positioned in the piston rod 26 in a form-locked fashion and rests with an annular end surface 80 oriented toward the piston 1 against a first inner base wall inner surface 81 of the base wall 79. The rest of the threaded pin 76 protrudes through the annular opening of the base wall 79 out of the piston rod 26 and extends analogously to the screw shaft 28 through the two expansion compensation discs 13; 15 and the piston 1 (not shown). The two expansion compensation discs 13; 15 and the piston 1 are clamped to the piston rod 26 by screwing the nut 77 onto the other end of the threaded pin 76. In this case, a second outer base wall inner surface 82 of the base wall 79 rests against the second disc end surface 45.

Figure 12:
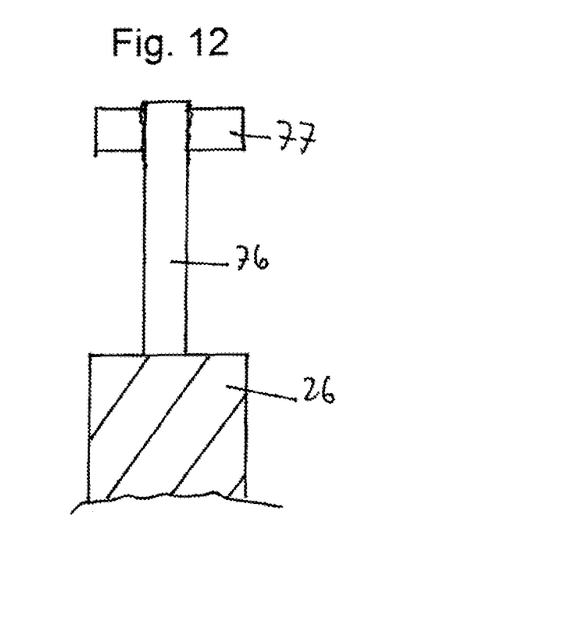
FIG. 12: is a simplified longitudinal section through the piston rod with a screw according to another alternative embodiment of the screw.

In lieu of the thickened end region 78, the threaded pin 76 can also be solidly connected to the rod end of the piston rod 26 oriented toward the piston 1, e.g. can be formed onto it (FIG. 12). The piston rod 26 is then preferably embodied as solid.

When the threaded pin 76 is used as a screw, the in particular rough calculation of the length changes must be correspondingly adapted. Depending on the circumstances, for example, the length change of the nut 77 must be taken into account.

The arrangement according to the invention is also suitable for use for both reciprocating piston machines that function in accordance with the 2-stroke principle and those that function in accordance with the 4-stroke principle, in particular reciprocating piston engines. Moreover, it is suitable not only for reciprocating piston machines with a Scotch yoke mechanism, but also for any kind of reciprocating piston machine in which the piston rod is rigidly connected to the piston and in particular, is guided in linear fashion, for example crosshead engines or engines with hypocycloidal linear guidance. The invention is naturally not limited to reciprocating piston engines and reciprocating piston internal combustion engines, but can also be used in reciprocating piston compressors such as oxygen compressors or reciprocating piston pumps or reciprocating piston steam engines such as a Murray steam engine.

The invention claimed is:

1. A reciprocating piston machine, comprising:
   a reciprocating piston consisting essentially of a ceramic material;
   a crank mechanism, in particular a Scotch yoke mechanism, in which the piston is rigidly connected to a piston rod by a cap screw, and in which at least one disc composed of a metallic material is clamped between the reciprocating piston and the piston rod;
   wherein the screw comprises a metallic material;
   a thermal expansion coefficient $\alpha_{piston}$ of the material of the reciprocating piston is lower than a thermal expansion coefficient $\alpha_{screw}$ of the material of the screw and the at least one disc is an expansion compensation disc;
   a thermal expansion coefficient $\alpha_{disc1;2}$ of the material of the expansion compensation disc is greater than the thermal expansion coefficient $\alpha_{screw}$ of the material of the screw; and
   wherein a difference between a clamping force of the cap screw at room temperature and a clamping force at a rated operating temperature of the reciprocating piston machine, which the reciprocating piston machine assumes during extended operation at a rated speed, is <0.

2. The reciprocating piston machine as recited in claim 1, comprising two expansion compensation discs, and the reciprocating piston is clamped between the two expansion compensation discs.

3. The reciprocating piston machine as recited in claim 2, wherein the thermal expansion coefficient $\alpha_{disc1}$ of a first expansion compensation disc is $15.0 \cdot 10^{-6}$ to $19.0 \cdot 10^{-6}$ $K^{-1}$.

4. The reciprocating piston machine as recited in claim 3, wherein the thermal expansion coefficient $\alpha_{disc2}$ of a second expansion compensation disc is $15.0 \cdot 10^{-6}$ to $19.0 \cdot 10^{-6}$ $K^{-1}$.

5. The reciprocating piston machine as recited in claim 1, wherein the thermal expansion coefficient $\alpha_{piston}$ is $3.0 \cdot 10^{-6}$ to $6.5 \cdot 10^{-6}$ $K^{-1}$.

6. The reciprocating piston machine as recited in claim 1, wherein the thermal expansion coefficient $\alpha_{screw}$ is $8.0 \cdot 10^{-6}$ to $10.0 \cdot 10^{-6}$ $K^{-1}$.

7. The reciprocating piston machine as recited in claim 1, wherein the reciprocating piston comprises a graphite material.

8. The reciprocating piston machine as recited in claim 1, wherein the thermal expansion coefficient $\alpha_{screw}$ of the material of the cap screw, the thermal expansion coefficients $\alpha_{disc1;2}$ of the material of the expansion compensation disc, the thermal expansion coefficient $\alpha_{piston}$ of the material of the piston; a thermal expansion coefficient $\alpha_{piston\ rod}$ of a material of the piston rod; and a thermal expansion coefficient $\alpha_{threaded\ bushing}$ of a material of a threaded bushing, clamped lengths of parts clamped by the cap screw, and a clamping length of the cap screw are dimensioned so that the difference between the clamping force of the cap screw at room temperature and the clamping force at the rated operating temperature of the reciprocating piston machine, which the reciprocating piston machine assumes during extended operation at the rated speed, is <0.

9. The reciprocating piston machine as recited in claim 8, wherein the clamping force of the cap screw at room temperature is less than the clamping force at the rated operating temperature of the reciprocating piston machine.

10. A cylinder of the reciprocating piston machine as recited in claim 1, comprising
- at least one ceramic cylinder bushing situated in a cylinder bore of the cylinder, wherein the reciprocating piston is ceramic and is guided so that the reciprocating piston can reciprocate in the cylinder bushing without piston lubrication, and
- wherein the ceramic reciprocating piston comprises a carbon material and the ceramic cylinder bushing comprises a silicon carbide material.

11. The reciprocating piston as recited in claim 1, wherein the ceramic reciprocating piston comprises at least one of the group consisting of a carbon material, a carbon material enriched with a metal or metal alloy, a silicon carbide material, a graphite material, carbon graphite, and electrographite.

* * * * *